United States Patent [19]

Yang et al.

[11] Patent Number: 5,436,903
[45] Date of Patent: Jul. 25, 1995

[54] METHOD AND APPARATUS FOR USE IN A NETWORK OF THE ETHERNET TYPE, TO IMPROVE FAIRNESS BY CONTROLLING COLLISION BACKOFF TIMES AND USING STOPPED BACKOFF TIMING IN THE EVENT OF CHANNEL CAPTURE

[75] Inventors: Henry S. Yang, Andover; Kadangode K. Ramakrishnan, Maynard; Anthony G. Lauck, Wellesley, all of Mass.

[73] Assignee: Digital Equipment Corporation, Maynard, Mass.

[21] Appl. No.: 263,698

[22] Filed: Jun. 22, 1994

Related U.S. Application Data

[63] Continuation-in-part of Ser. No. 85,866, Jun. 30, 1993.

[51] Int. Cl.⁶ .......................................... H04L 12/413
[52] U.S. Cl. ................................................ 370/85.3
[58] Field of Search .................... 370/94.1, 94.2, 60, 370/60.1, 85.1, 85.2, 85.3, 86; 340/825.5, 825.51

[56] References Cited

U.S. PATENT DOCUMENTS

4,707,829 11/1987 Pendse ............................... 370/94.1

Primary Examiner—Douglas W. Olms
Assistant Examiner—Ajit Patel
Attorney, Agent, or Firm—Kenneth F. Kozik

[57] ABSTRACT

A technique for modifying the IEEE 802.3 standard for selecting backoff times in a Carrier Sense Multiple Access with Collision Detection (CSMA/CD) network, in the event that a collision is sensed by a node that has captured the network communication channel. If there is a small number of active nodes on the network, one node may capture the channel and the standard backoff algorithm makes it increasingly unlikely for another node to transmit. The new technique provides for less aggressive, i.e. longer, backoff times before at least the first retransmission attempt made by a node that has captured the channel, and in addition provides for the use of a stopped backoff algorithm. Three specific examples of methods to choose a backoff time and two methods of using a stopped backoff algorithm are disclosed. Even though the invention represents a departure from the standard CSMA/CD backoff algorithm, the overall average backoff times provided by the invention can be selected to be consistent with the average times provided by the standard. Moreover, nodes using the invention interoperate successfully with nodes that do not use the invention.

11 Claims, 4 Drawing Sheets

METHOD AND APPARATUS FOR USE IN A NETWORK OF THE ETHERNET TYPE, TO IMPROVE FAIRNESS BY CONTROLLING COLLISION BACKOFF TIMES AND USING STOPPED BACKOFF TIMING IN THE EVENT OF CHANNEL CAPTURE

This application is a continuation in part of the U.S. patent application of Henry Sho-Che Yang, Kadangode K. Ramakrishnan, William R. Hawe, and Anthony Lauck, Ser. No. 08/085,866, filed Jun. 30, 1993, entitled "Method And Apparatus For Use In A Network Of The Ethernet Type, To Improve Fairness By Controlling Collision Backoff Times In The Event Of Channel Capture".

BACKGROUND OF THE INVENTION

This invention relates generally to local area networks (LANs) of the Ethernet type and, more particularly, to techniques for improving fairness of channel access in an Ethernet LAN. Ethernet is a commonly used name for a LAN that uses a network access protocol referred to as Carrier Sense Multiple Access with Collision Detection (CSMA/CD). The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE 802.3 standard." The standard is for a 10 Mbps (megabits/sec) CSMA/CD channel, but it will be understood that the present invention may also be applicable to a 100 Mbps channel.

Under the CSMA/CD rules for access to a network bus or cable, which will be referred to as the channel, any node or station wishing to transmit must first "listen" to make sure that the channel is clear before beginning to transmit. All nodes on the network have equal priority of access and may begin transmitting as soon as the channel is clear and a required inter-packet delay of 9.6 $\mu$s (microseconds) has elapsed. However, if a first node that has started transmitting detects a "collision" with a transmission from another node, the first node continues transmitting for a short time to make sure that all nodes wishing to transmit will detect the collision. Every other node detecting the collision also continues to transmit for a short time. Then each node that has detected a collision terminates transmission of the packet or frame. The nodes involved in the collision wait for the required interpacket delay of 9.6 $\mu$s and then select random, and therefore usually different, delay times, referred to as backoff times, before trying transmission of the same packet again.

More specifically, the IEEE 802.3 standard defines a collision backoff procedure referred to as "truncated binary exponential backoff." When a transmission attempt has terminated due to a collision, it is retried by the transmitting node, after a selected backoff time, until either the transmission is successful or a maximum number of attempts have been made and all have terminated due to collisions. The backoff time is selected by each node as an integral multiple of the "slot time," which is the maximum round-trip propagation time for the network, i.e. the time to propagate a data packet from one end of the network to the other, and back. The slot time defined by the IEEE 802.3 standard is 51.2 $\mu$s. The number of slot times selected as the backoff time before the nth retransmission is chosen as a randomly distributed integer r in the range:

$$0 \leq r < 2^k, \text{ where } k = \min(n, 10).$$

Therefore, for the first attempted retransmission the backoff time is selected as 0 or 1 slot times, for the second attempted retransmission the backoff time is selected as 0, 1, 2 or 3 slot times, for the third attempted retransmission the backoff time is selected as 0, 1, 2, 3, 4, 5, 6 or 7 slot times, and so forth. The maximum backoff time, for the tenth attempted retransmission may be up to $2^{10}-1$, or 1,023 slot times, i.e. 52.4 ms.

The IEEE 802.3 standard is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect is best understood from a simple example.

Suppose there are two active nodes, A and B, in a network and they begin transmitting at approximately the same time, resulting in a first collision. They each select backoff times of 0 or 1 slot time, in accordance with the standard backoff algorithm. Suppose further that node A selects zero backoff time and node B selects one slot time as its backoff time. Obviously, node A will be able to successfully transmit on its first attempt at retransmission. Node B will wait a full slot time before making its first retransmission attempt, but by this time node A has started transmitting a second data packet, i.e. node A is transmitting successive packets back-to-back, with only the required interpacket gap (IPG) separating them. Node B experiences a second collision on its first data packet, but for node A it is still a "first" collision for trying to transmit a second data packet. In accordance with the standard backoff algorithm, node A selects a backoff of 0 or 1 slot time, but node B selects a backoff of 0, 1, 2 or 3 slot times. Therefore, node B has only one chance in eight of winning access to the channel (if node B chooses 0 and node A chooses 1). Node A, however, has five chances in eight of winning channel access. (Two of the eight possibilities will result in another collision.) Clearly, it is more probable, actually five times more probable, that node A will retain access to the channel, as compared with node B. If the probable occurs, and node A transmits its second data packet,the situation becomes progressively more difficult for node B to transmit. If another collision occurs on node B's next attempt to retransmit, this will be node B's third attempt, but node A's "first" again. Node A's backoff is still 0 or 1 slot time, but node B's is selected from 0 through 7 slot times. Node A is then thirteen times as likely to win access to the channel on the next attempted retransmission. For the nth attempt at retransmission by node B, node A will be $(2^n-3)$ times more likely to win access to the channel. For the maximum value of n, i.e. 10, the unfairness factor between the two active nodes will be $2^{10}-3$, or 1,021.

For network protocols that require a receiving node to acknowledge that it has received a packet, the situation is further aggravated by the need to transmit acknowledgment messages on the network. For example node A captures the channel and is sending successive packets to node B, node B may be unable to acknowledge even the first received packet. Node A will eventually have to give up the channel to allow acknowledgements to flow back from node B, but this is an inefficient process and channel utilization goes down.

It will be appreciated from the foregoing that there is a need for improvement over the standard approach for selecting random backoff times in a network using the CSMA/CD protocol. Ideally, any improved technique should still comport with the objects of the IEEE 802.3 standard and should be compatible with nodes that use the standard without improvement. The present invention achieves these ends, as will become apparent from the following summary.

One approach has been to assign special backoff times to a node based on the node's recent transmission attempt history. These special backoff algorithms, however, sometimes have the undesirable effect of reducing channel throughput.

SUMMARY OF THE INVENTION

The present invention resides in a technique that modifies the standard backoff approach in the event that a channel capture condition is detected. The basic method of the invention is for use in a node of a network employing a Carrier Sense Multiple Access with Collision Detection (CSMA/CD) protocol to control channel access. The method comprises the steps of sensing when a node has captured the channel by successfully transmitting a first data packet and beginning to transmit a second data packet without relinquishing the channel to another node, then, after sensing capture of the channel, sensing a collision between the second packet transmission and a transmission by another node; after sensing a collision, selecting a backoff time to wait before attempting retransmission, wherein the backoff time before at least the first retransmission attempt is selected to be actually or potentially longer than if the node had not captured the channel, and finally, potentially using a stopped backoff algorithm during the backoff period. The less aggressive backoff time selected for a node that has captured the channel gives a node that has not captured the channel at least one transmission opportunity that it would not otherwise have.

A first method of implementing the invention comprises the steps of sensing when a node has captured the channel, then, after sensing capture of the channel, sensing a collision between a second packet transmission and a transmission by a different node on the network, and, after sensing the collision, selecting a backoff time to wait before attempting retransmission, wherein the backoff time before at least the first retransmission attempt is selected to be actually or potentially longer than if the node had not captured the channel, then, monitoring the channel for activity from a different node on the network, operating a backoff timer when the channel is idle, halting the backoff timer during any period in which the channel is not idle, and finally, attempting retransmission when the backoff timer expires.

A second method of implementing the invention comprises the steps of sensing when the node has captured the channel, then, after sensing capture of the channel, sensing a collision between a second packet transmission and a transmission by a different node on the network, after sensing the collision, selecting a backoff time to wait before attempting retransmission, wherein the backoff time before at least the first retransmission attempt is selected to be actually or potentially longer than if the node had not captured the channel, then, determining if the node is waiting a first backoff time for a first retransmission attempt, and, in response to a determination that the node is waiting a first backoff time, monitoring the channel for activity from a different node on the network, operating a backoff timer when the channel is idle, and halting the backoff timer during any period in which the channel is not idle, and, in response to a determination that the node is not waiting a first backoff time, operating the backoff timer, and finally, attempting retransmission when the backoff timer expires.

The step of monitoring the channel for activity from a different node in either implementation further comprises recognizing when a different node is transmitting on the channel, recognizing when a collision is occurring on the channel, and recognizing when a different node is transmitting or a collision is occurring on the channel.

A node may use the invention for all packet transactions on a channel, or for selected packet transactions only. A selective implementation of the invention includes the additional steps of examining the contents of a data field in a packet which requires retransmission in order to determine whether a special backoff algorithm should be used for the packet, and, in response to a determination that the special backoff algorithm should be used, selecting a backoff time to wait before attempting retransmission, wherein the backoff time before at least the first retransmission attempt is selected to be actually or potentially longer than if the node had not captured the channel, and wherein the backoff time before a second retransmission attempt is selected to be actually or potentially shorter than if the node had not captured the channel, monitoring the channel for activity from a different node on the network, operating a backoff timer when the channel is idle, and halting the backoff timer during any period in which the channel is not idle, and, in response to a determination that the special backoff algorithm should not be used, operating a backoff timer, and finally, attempting retransmission when the backoff timer expires.

The invention may also be defined in terms of an apparatus, comprising means for sensing when the node has captured the channel, means for, after sensing capture of the channel, sensing a collision between a second packet transmission and a transmission by a different node on the network, means for, in response to sensing the collision, selecting a backoff time to wait before attempting retransmission, wherein the backoff time before at least the first retransmission attempt is selected to be actually or potentially longer than if the node had not captured the channel, means for monitoring the channel for activity from a different node on the network, a backoff timer, means for operating the backoff timer when the channel is idle, means for halting the backoff timer during any period in which the channel is not idle, and means for attempting retransmission when the backoff timer expires. A second apparatus embodying the invention also includes means for determining if the node is waiting a first backoff time for a first retransmission attempt, means for, in response to a determination that the node is waiting a first backoff time, monitoring the channel for activity from a different node on the network, operating a backoff timer when the channel is idle, and halting the backoff timer during any period in which the channel is not idle, means for, in response to a determination that the node is not waiting a first backoff time, operating a backoff timer, and means for attempting retransmission when the backoff timer expires.

It will be appreciated from the foregoing that the present invention represents a significant advance in the field of local area networks of the Ethernet or IEEE 802.3 type. The invention improves fairness of channel access in networks with small numbers of active nodes, since these configurations are most prone to unfairness caused by channel capture. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention is concerned with an improved technique for randomly selecting backoff times in a LAN that uses a network access protocol referred to as Carrier Sense Multiple Access with Collision Detection (CSMA/CD). Under the CSMA/CD rules for access to a network channel, any node wishing to transmit must first "listen" to make sure that the channel is idle before beginning to transmit. All nodes on the network have equal priority of access and may begin transmitting as soon as the channel is idle and a required interpacket delay has elapsed.

Figure 1:
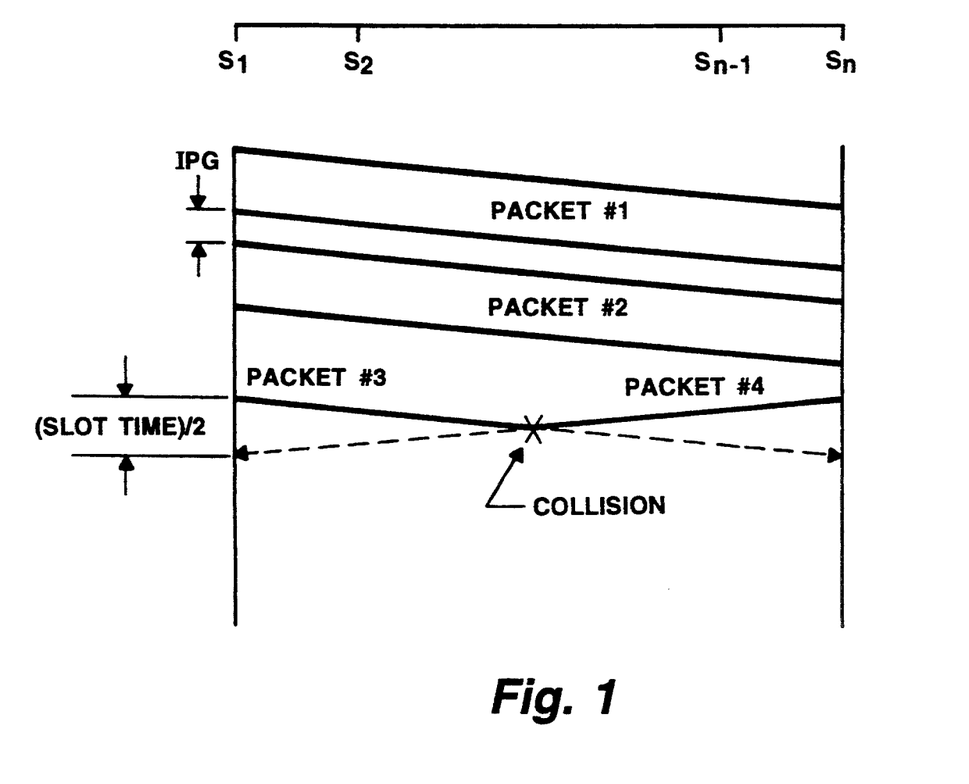
FIG. 1 is a diagram showing the principles of collision detection in a CSMA/CD LAN.

FIG. 1 is a graphical diagram that is useful in visualizing channel access concepts in a LAN of the Ethernet or IEEE 802.3 standard type. The horizontal axis of the diagram represents distance along the channel from a first node $S_1$ on the left-hand side to an nth node $S_n$ on the right-hand side. The vertical axis represents time. The area designated Packet #1 represents the transmission of a data packet by node $S_1$ onto the channel. The vertical dimension of this area indicates that the packet takes a certain time for $S_1$ to transmit it. The downward slope of the area is consistent with the propagation delay associated with the packet as it is transmitted along the channel. Thus node $S_n$ receives the packet some time after it was transmitted.

After transmitting Packet #1, node $S_1$ waits for a required interpacket gap (IPG) time, which the standard defines as 9.6 μs, and if no other channel activity is detected, begins transmitting another packet, as indicated by the area "Packet #2." This is a back-to-back transmission of successive data packets, and thus far it has been assumed that there was no competition for access to the channel.

The next portion of FIG. 1 shows the effect of practically simultaneous transmission attempts from nodes $S_1$ and $S_n$. Transmission of Packets #3 and #4 were both started after the transmitting nodes detected an idle channel. The packets collide in mid-channel, as indicated diagrammatically in FIG. 1, and an indication of the collision is provided to the transmitting nodes, and to all the other nodes, as indicated by the broken lines in the figure. It will be appreciated from the figure that the time for node $S_1$ to learn of the collision is the round-trip propagation time from the transmitting node to the collision point, and back. It will also be appreciated that the collision point may be almost at the other end of the channel, adjacent to node $S_n$. Then the delay in learning of the collision would be the round-trip propagation time from one end of the channel to the other. This time is referred to as one slot time, and is defined by the IEEE 802.3 standard as a maximum of 51.2 μs.

In the event of a collision, each active node defers its next attempt to transmit by a random time that is an integral multiple r of the slot time. Specifically, for the nth attempt at retransmission r is chosen from the range:

$0 \leq r < 2^k$, where k=min (n, 10).

Therefore, the backoff time is selected from the following ranges of times, depending on how many retransmission attempts have been made:

| Retransmission attempt no. n | Backoff time in slot times r (selected at random from:) |
| --- | --- |
| 1 | 0,1 |
| 2 | 0,1,2,3 |
| 3 | 0,1,2,3,4,5,6,7 |
| 4 | 0 through 15 |
| n | 0 through ($2^n-1$) |
| 10 (maximum n) | 0 through 1,023 |

The standard backoff algorithm is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect arises because the range of backoff times increases exponentially with the number of retransmission attempts. If one of two active nodes loses channel access, the losing node has a progressively decreasing probability of gaining access so long as the other node continues to transmit back-to-back packets.

FIRST EXEMPLARY EMBODIMENT

In accordance with the invention, when a node senses that it has captured the channel, after the next collision it selects a backoff time that is less aggressive (i.e. tends to be longer) than the backoff time designated by the standard backoff algorithm. This provides an increased opportunity for another node to gain access to the channel, and results in improved performance when there are only two active nodes, or in networks having a small number of nodes.

The selection of backoff times for a node in the capture condition may be made in accordance with one of several different specific approaches. A common feature of the approaches is that each provides for a less aggressive (i.e. potentially or definitely longer) backoff time for the first retransmission attempt by a node that has captured the channel. Three examples are provided below.

EXAMPLE 1

For n=1 (first retransmission attempt), a backoff of 2 slot times is always selected for a node that has captured the channel. For n=2 (second retransmission attempt), a backoff of 0 slot times is selected. For n>2, the standard backoff time of r slot times is selected, where r is in the range: $0 \leq r < 2^k$, where k=min (n, 10). Note that the average of first two collision backoff times is one slot time, which is the same as the average for the first two backoff times using the standard algorithm.

EXAMPLE 2

For n=1 (first retransmission attempt), a backoff of r slot times is selected for a node that has captured the channel, where r in this case is in the range $0 \leq r < 4$. For n=2 (second retransmission attempt), a backoff of r slot times is selected, where r in this case is in the range $0 \leq r < 2$. For n>2, the standard backoff time of r slot times is selected, where r is in the range: $0 \leq r < 2^k$, and k=min (n, 10). Note that, as in Example 1, the average of first two collision backoff times is the same as the average for the first two backoff times using the standard algorithm. In fact the first two backoff times are equivalent to those in the standard algorithm, but reversed in sequence.

EXAMPLE 3

For n=1 (first retransmission attempt), a backoff of 4 slot times is always selected for a node that has captured the channel. For n>1 (second or subsequent retransmission attempt), the standard backoff time of r slot times is selected, where r is in the range:

$$0 \leq r < 2^k, \text{ where } k=\min (n, 10).$$

In this example, the average of the first two backoff times is higher than the average for the standard algorithm. Basically, this approach provides for a relatively long backoff as soon as the capture condition is detected, followed by an immediate return to the standard approach.

The following table compares the standard approach with those of the three examples of the present invention:

| Backoff technique | Backoff Time (Slot times) | | |
|---|---|---|---|
| | n = 1 | n = 2 | n = 2 |
| IEEE Standard | 0–1 | 0–3 | 0–7 |
| Example #1 | 2 | 0 | 0–7 |
| Example #2 | 0–3 | 0–1 | 0–7 |
| Example #3 | 4 | 0–3 | 0–7 |

SECOND EXEMPLARY EMBODIMENT

These improved backoff algorithms, however, may exhibit undesirable characteristics resulting in lower throughput on the channel in some circumstances. For example, under a worst case load, where two nodes have an infinite number of packets to transmit, for every packet transmitted, there is a corresponding collision. This is characterized as a 100% collision rate. A simple example will demonstrate how this occurs.

Suppose there are two active nodes, A and B, in a network and node A has determined it has captured the channel. Node B begins to transmit, and a collision occurs. When a collision occurs, using the algorithm in Example 1, above, node A will select backoff time of 2. Suppose further that node B, using the standard algorithm, selects a zero backoff time. Obviously, node B will be able to successfully transmit on its first attempt at retransmission. After node B has successfully transmitted, both node A and node B will again simultaneously transmit a packet because again, each node has an infinite number packets to transmit. At this point, in accordance with the invention, node B will determine it has captured the channel because it has successfully transmitted a packet and is now transmitting another packet without having received a packet or fragment of a packet since the successful transmission. Node A, on the other hand, will clear any indication that it has captured the channel. With this second simultaneous transmission, a second collision will occur. Now node B, which has captured the channel, will select a backoff time of 2. According to the invention, node A selects a backoff of zero. Node A will successfully transmit a packet upon its retransmission attempt, and the whole cycle outlined in this example will begin again. The two nodes will take turns successfully transmitting a packet, but for each packet transmitted there will be a collision.

The addition of a stopped backoff algorithm alleviates this undesirable characteristic. Using a stopped backoff algorithm, a node delays its retransmission attempt depending on channel activity. The stopped backoff algorithm requires a node to stop its backoff timer when it detects that the channel is busy, e.g. when the receive carrier or collision signal is active.

Stopped backoff algorithms have been used in LANs having a large number of nodes. The original motivation for stopped backoff algorithms arose because of the following situation: a collision occurs involving n nodes. One of the nodes or even a different node, say node X, gains access to the network and initiates a long data transfer. During this long transfer, many or all the n nodes involved in the collision may complete their backoff waiting period and attempt a retransmission immediately following node X's long transfer, leading to another multi-node collision. Stopped backoff algorithms reduce the occurrence of end-of-transmission collisions by forcing the nodes on the network to wait a random amount of time from the end of node X's transmission before attempting a retransmission.

One stopped backoff algorithm was introduced by Madhav Marathe in a paper submitted to the IEEE entitled, "Design Analysis of a Local Area Network", 1980. (Citation?). A second stopped backoff algorithm, used in IEEE 802.3 compliant products, works as follows: while a node is in a backoff state following a collision, it stops its backoff timer when it detects channel activity on its receive carrier or collision signal inputs. The running of the backoff timer is resumed when the channel becomes idle.

The improved feature of the present invention may be implemented in different ways. Two methods are described, the first of which represents the preferred embodiment of the present invention.

METHOD 1

If a node has attempted a back-to-back transmit, and a collision has occurred, the node uses one of the special backoff algorithms described above in Examples 1, 2 or 3 to select a backoff time. Only after a first collision and corresponding first retransmission attempt backoff time, the node it halts its backoff timer during any period in which the channel is busy, e.g. when the node detects activity on its receive carrier or collision signal. The backoff timer is continued, without being reset, when the channel becomes idle. For any collision after the first collision, the node uses one of the special backoff algorithms without a stopped backoff algorithm.

METHOD 2

If a node has attempted a back-to-back transmit, and collision has occurred, the node uses one of the special backoff algorithms described above in Examples 1, 2 or 3 to select a backoff time. For any collision and its corresponding retransmission attempt backoff time, the node halts its backoff timer during any period in which the channel is busy, e.g. when the node detects activity on its receive carrier or collision signal. The backoff timer is continued, without being reset, when the channel becomes idle.

Figure 2:
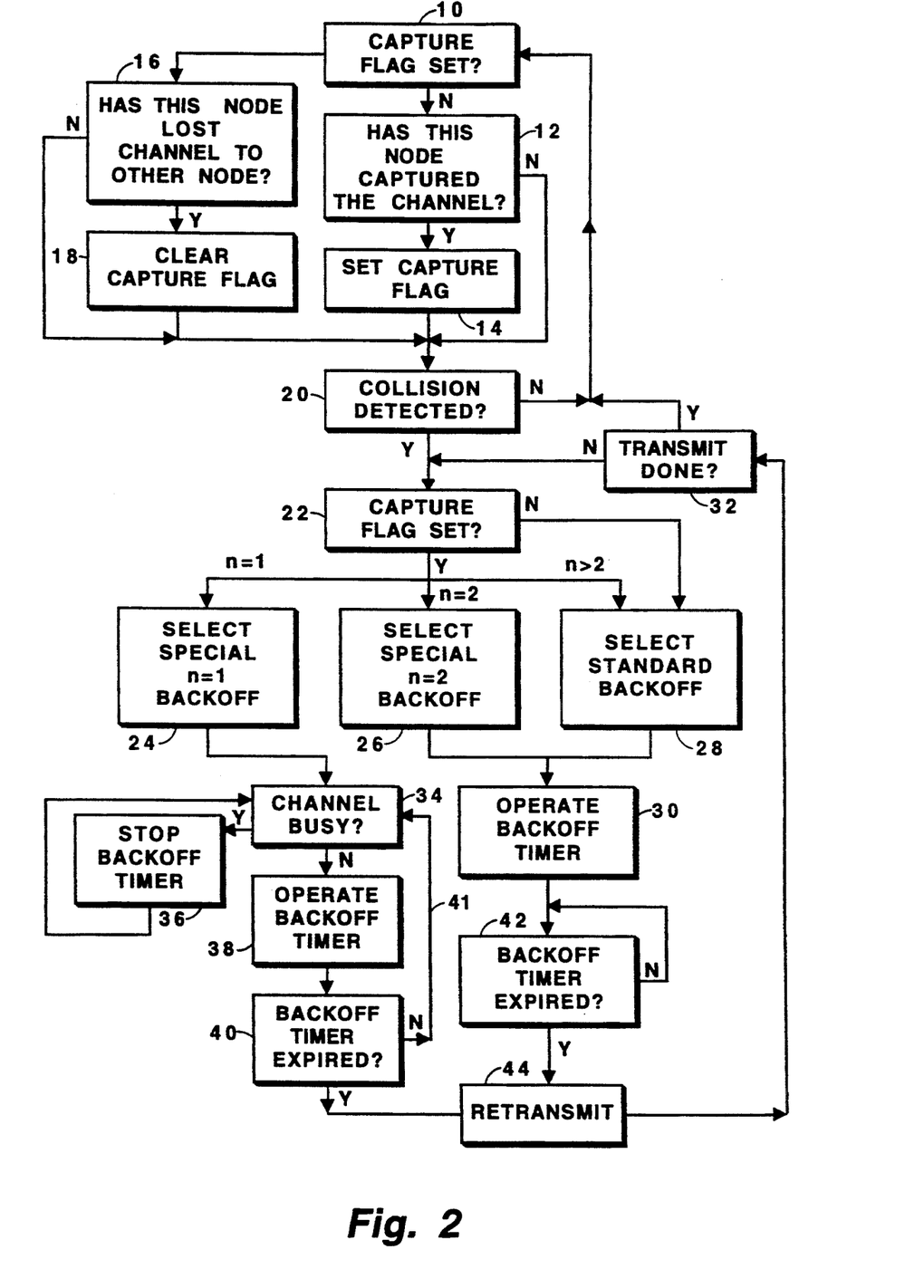
FIG. 2 is a flowchart showing the principles of a first and preferred embodiment of the present invention.

Turning now to FIG. 2, there is shown the functions performed in a node implementing the Method 1 of the present invention. The node continually monitors its operation to determine whether it has captured the channel, and maintains a capture flag to record this status. In the presently preferred embodiment of the invention, channel capture is defined to have occurred when a node begins transmitting a data packet without having received a packet, or a fragment of a packet, from the network since the node's transmission of a prior packet. Under this definition, the subsequent packet transmission may occur immediately upon the expiration of a required inter-packet gap (IPG) following the transmission of the prior packet, or may occur at some later time following transmission of the prior packet. When a node successfully transmits a packet, it retains memory of this event during a subsequent idle period. When the node starts a subsequent packet transmission without an intervening transmission by another node, the node is said to have captured the channel. This channel capture test is easy to implement and results in rapid and consistent application of the principle of the invention.

An alternative approach to testing for channel capture is to require back-to-back transmissions by a node before the node is declared to have captured the channel. Therefore, channel capture will be detected upon beginning transmission of a second packet immediately after transmitting a first packet and waiting for the required interpacket gap. Although this approach is satisfactory, it results in a delay in the application of the invention for a network with a larger number of nodes. When two nodes are competing for channel access, a number of collisions may be needed before one node gains access and is subsequently declared to have captured the channel. In the preferred approach to declaring channel capture, at any instant in time one of two active nodes on the network will always be considered to have captured the channel, even though there may be intervening idle periods. Therefore, on the occurrence of a first collision the node that has captured the channel immediately backs off less aggressively.

As indicated in block 10, if this node currently does not have its capture flag set, a check is made (block 12) to determine if the node has captured the channel, i.e. whether it is transmitting the second of two back-to-back packets. If so, the capture flag is set, as indicated in block 14. If the capture flag was not set, a check is made to determine whether this node has lost access to the channel, as indicated in block 16. If so, the capture flag is cleared, as indicated in block 18.

Following these steps to maintain the capture flag, if no collision is detected, processing in the node continues, and the capture flag maintenance steps discussed above will be repeated continually. It will be understood, of course, that other forms of processing take place in the node, but these have been omitted for clarity.

If a collision is detected, as indicated in block 20, the capture flag is again checked, in block 22. If it is set, a special backoff time may be selected, depending on how many transmission attempts have been made.

For the first retransmission attempt (n=1) after a collision (and after detection of capture by this node), a less aggressive backoff time is selected, as indicated in block 24. A less aggressive backoff time is one that is longer than the standard backoff period.

Because this is the first retransmission attempt, the stopped backoff algorithm is incorporated into the node's backoff algorithm. First, as indicated by block 34, the node checks to see if the channel is busy. If the channel is not busy, the node begins to operate its backoff timer as shown in block 38. If the channel is busy, the node will not start its backoff timer, as indicated in block 36, and will continue to monitor the channel, as in block 34, until the channel is not busy, at which point the node can start its backoff timer, as shown in block 38. While the node is operating its backoff timer, it checks whether or not the timer has expired, as indicated in block 40. If the timer has not yet expired, the node continues to monitor the channel by branching along path 41, and halt its backoff timer at block 36 during any period in which the channel becomes busy, as detected in block 34.

If the node's backoff timer has expired, the node may then attempt to retransmit, as shown in block 44.

For the second retransmission attempt, another backoff time may be selected, as indicated in block 26. The backoff time for the second retransmission attempt is more aggressive, i.e. shorter, than the standard time. For third or later attempts at retransmission (n>2), the standard backoff time is selected, as indicated in block 28; i.e. a backoff time of from 0 through 7 slot times for n=3, 0 through 15 for n=4, and so forth. If the capture flag is not set, as determined in block 22, the standard backoff time is also selected. After selection of a backoff time, the node operates its backoff timer, as indicated in block 30. As shown in block 42, the node continually checks whether the backoff timer has expired. When the backoff timer does expire, the node attempts to retransmit its packet as indicated in block 44.

After attempting to retransmit, the next operation performed depends on whether or not a packet has been successfully transmitted. If the transmit operation for the packet is complete, as determined in block 32, processing continues with block 10. If the transmit operation for the packet is not complete, processing continues with block 22, to check the capture flag and choose an appropriate backoff time before the next retransmission attempt.

Figure 3:
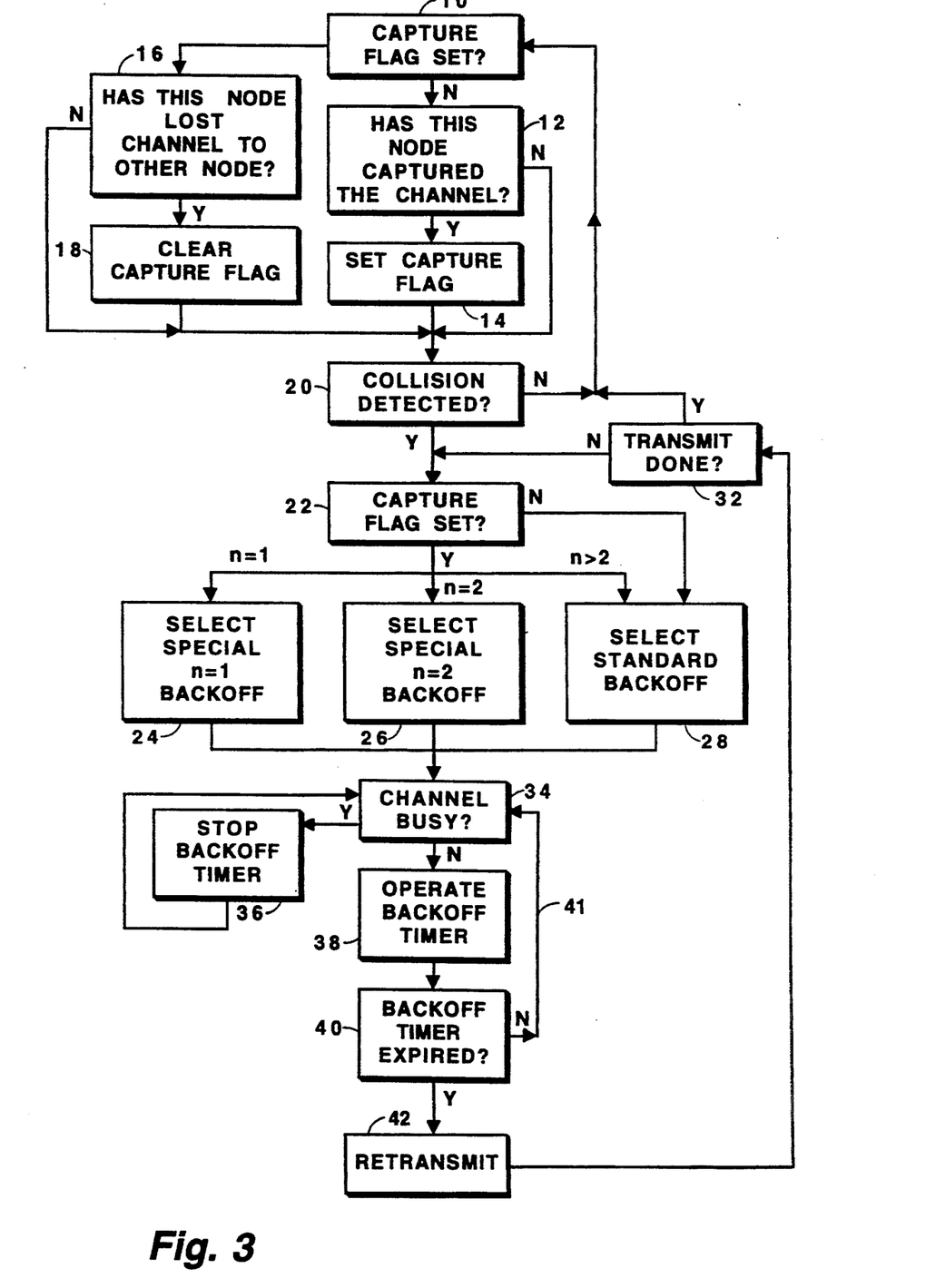
FIG. 3 is a flowchart showing the principles of a second embodiment of the present invention.

Turning now to FIG. 3, there is shown the functions performed in a node implementing Method 2 of the present invention. As indicated in block 10, if this node currently does not have its capture flag set, a check is made (block 12) to determine if the node has captured the channel, i.e. whether it is transmitting the second of two back-to-back packets. If so, the capture flag is set, as indicated in block 14. If the capture flag was not set, a check is made to determine whether this node has lost access to the channel, as indicated in block 16. If so, the capture flag is cleared, as indicated in block 18.

Following these steps to maintain the capture flag, if a collision is detected, as indicated in block 20, an appropriate backoff time is selected, to determine the time that must elapse before retransmission is initiated. If no collision is detected, processing in the node continues, and the capture flag maintenance steps discussed above will be repeated continually. It will be understood, of course, that other forms of processing take place in the node, but these have been omitted for clarity.

When a collision is detected (in block 20), the capture flag is again checked, in block 22. If it is set, a special backoff time may be selected, depending on how many transmission attempts have been made. For the first retransmission attempt after a collision (and after detection of capture by this node), a less aggressive backoff time is selected, as indicated in block 24. A less aggressive backoff time is one that is longer than the standard backoff period. For the second retransmission attempt, another selected backoff time may be selected, as indicated in block 26. The backoff time for the second retransmission attempt is more aggressive, i.e. shorter, than the standard time. For third or later attempts at retransmission (n>2), the standard backoff time is selected, as indicated in block 28; i.e. a backoff time of from 0 through 7 slot times for n=3, 0 through 15 for n=4, and so forth, as required by the standard backoff algorithm. If the capture flag is not set, as determined in block 22, the standard backoff time is also selected.

After selection of a backoff time, the stopped backoff algorithm is incorporated into the node's backoff algorithm. First, as indicated by block 34, the node checks to see if the channel is busy. If the channel is not busy, the node begins to operate its backoff timer as shown in block 38. If the channel is busy, the node will not start its backoff timer, as indicated in block 36, and will continue to monitor the channel at block 34 until the channel is not busy, at which point the node can start its backoff timer, at block 38. While the node is operating its backoff timer, it checks whether or not the timer has expired, as indicated in block 40. If the timer has not yet expired, the node continues to monitor the channel by branching along path 41 and halt its backoff timer at block 36 during any period in which the channel becomes busy, as detected at block 34.

When the node's backoff timer has expired, the node attempts to retransmit a data packet, as indicated in block 42. After attempting to retransmit, the next operation performed depends on whether or not a packet has been successfully transmitted. If the transmit operation for the packet is complete, as determined in block 32, processing continues with block 10. If the transmit operation for the packet is not complete, processing continues with block 22, to check the capture flag and choose an appropriate backoff time before the next retransmission attempt.

After attempting to retransmit, the next operation performed depends on whether or not a packet has been successfully transmitted. If the transmit operation for the packet is complete, as determined in block 32, processing continues with block 10. If the transmit operation for the packet is not complete, processing continues with block 22, to check the capture flag and choose an appropriate backoff time before the next retransmission attempt.

Figure 4:
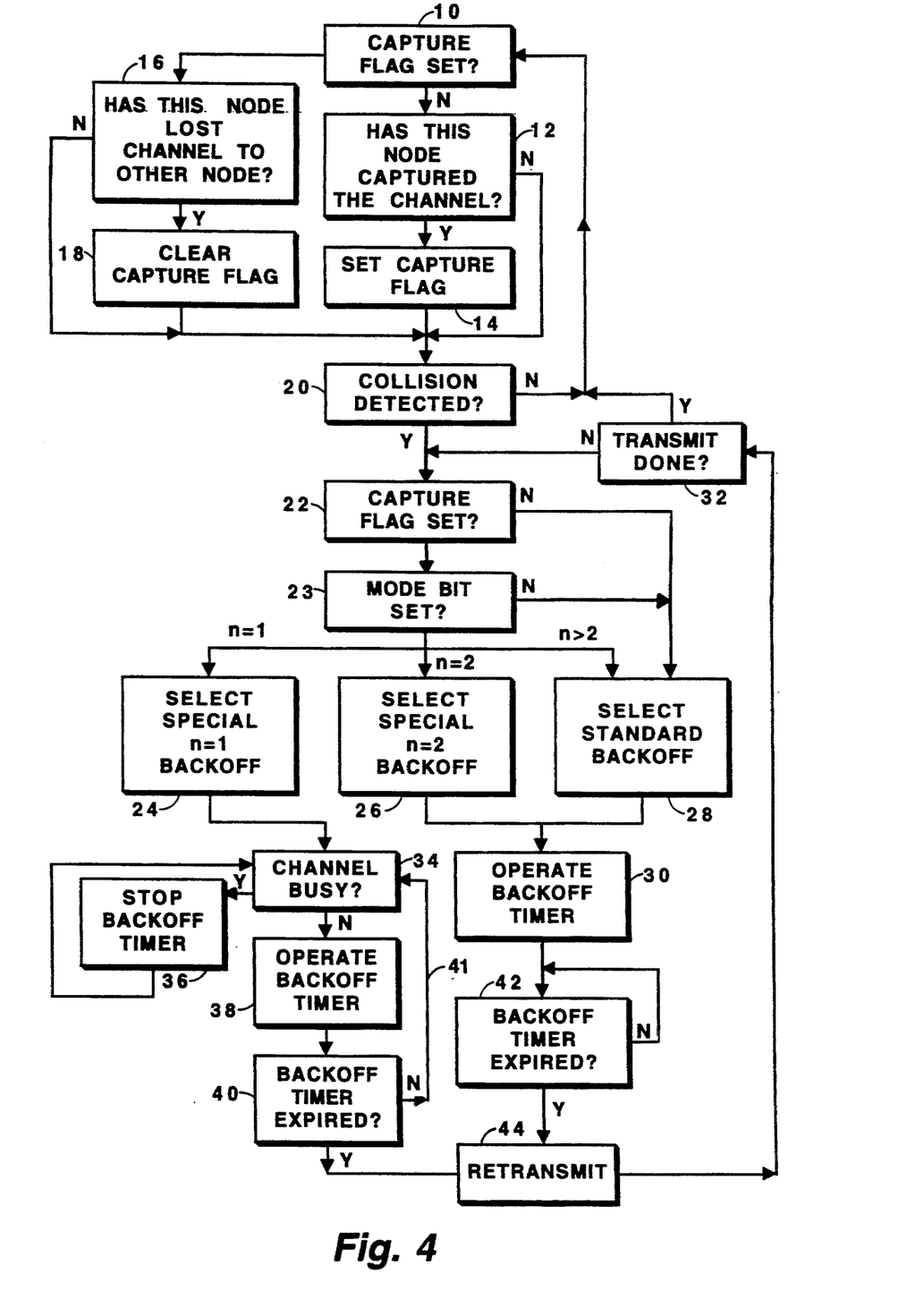
FIG. 4 is a flowchart showing the principles of a fourth embodiment of the present invention.
Figure 5:
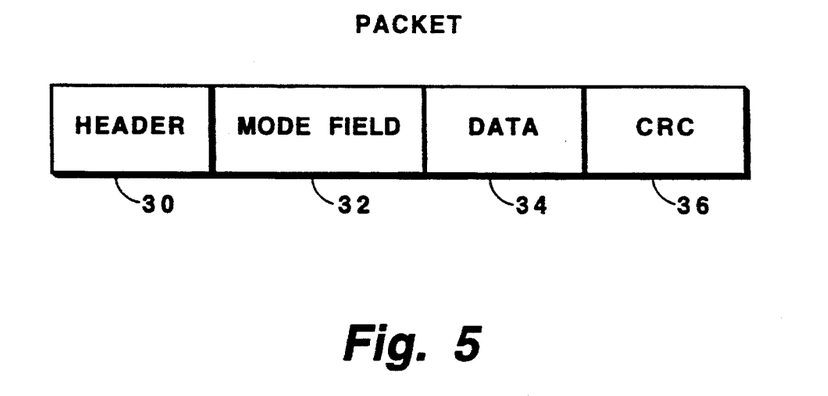
FIG. 5 is a diagram of the contents of a packet transmitted on a channel.

This invention may be implemented so that a node performs the improved algorithms for all packet transactions on the channel, or for only selected packet transactions. For example, a node may be designed with a mode bit in a register. When the mode bit is "on", the node will use the improved algorithms for all channel transactions. In the alternative, a node could be designed so that the node bases its decision on whether to use the improved algorithms depending on the contents of the packets themselves. All nodes have the capability of examining the contents of the packets they transmit or receive. All nodes contain network controller hardware which examines the contents of packets received or transmitted. To implement a selective version of this invention, a node could be programmed to recognize a particular bit pattern in a data field contained in a packet, as shown in block 23 of FIG. 4. Refer to FIG. 5 for a representation of a packet containing a mode designation field. If the particular bit pattern is present in the mode data field, the node would use a special backoff algorithm to successfully complete transmission of that packet.

The invention allows nodes in a CSMA/CD network to have improved performance when the network has only a small number of active nodes. The invention is becoming of increasing usefulness because there appears to be a trend toward LAN segments having fewer nodes, to provide more bandwidth to users. These smaller networks are more likely to expose the capture effect, which results in performance degradation. The invention applies equally well to 100 Mbps CSMA/CD LANs and to 10 Mbps CSMA/CD LANs. Moreover, nodes implementing the invention interoperate without modification with nodes using the IEEE 802.3 standard for collision backoff.

It will be appreciated from the foregoing that the present invention represents a significant advance in the field of CSMA/CD LANs. In particular, the invention provides for greatly improved fairness of access to a LAN channel when there is a small number of active nodes on the network. From a user standpoint, improved fairness also improves overall message throughput and latency. It will also be appreciated that, although three specific embodiments of the invention have been described, various modifications may be made without departing from the spirit and scope of the invention. Accordingly, the invention should not be limited except as by the appended claims.

We claim:

1. For use in a first node in a network having a plurality of nodes employing Carrier Sense Multiple Access with Collision Detection (CSMA/CD) protocol for channel access, a method for improving the fairness of access to a channel, comprising the steps of:

sensing whether or not the first node of the network has captured a channel;

sensing a collision between a first packet transmission by the first node and a second packet transmission by a second node of the network;

after sensing the collision, selecting a backoff time to wait before making each of a number of retransmission attempts of the second packet, the selected backoff time between each said attempt and the immediately preceding attempt conforming to a selected integral multiple r of a slot time, where r is a positive integer, and corresponding to the number of the retransmission attempts made previously, whereby, if the first node has captured the channel, the backoff time is a prescribed backoff time;

if the first node has not captured the channel, the backoff time before making at least a first of the retransmission of the attempts is selected to be r slot times longer than the prescribed backoff time;

monitoring the channel for activity from the second node on the network;

operating a backoff timer when the channel is idle;

halting the backoff timer during any period in which the channel is not idle; and attempting retransmission of the second packet when the backoff timer expires.

2. For use in a first node in a network having a plurality of nodes employing Carrier Sense Multiple Access with Collision Detection (CSMA/CD) protocol for channel access, a method for improving the fairness of access to a channel, comprising the steps of:

sensing whether or not the first node of the network has captured a channel;

sensing a collision between a first packet transmission by the first node of the network and a second packet transmission by a second node of the network;

after sensing the collision, selecting a backoff time to wait before making each of a number of retransmission attempts of the second packet, the selected backoff time between each said attempt and the immediately preceding attempt conforming to a selected integral multiple r of a slot time, where r is a positive integer, and corresponding to the number of the retransmission attempts made previously, whereby, if the first node has captured the channel, the backoff time is a prescribed backoff time;

if the first node has not captured the channel, the backoff time before making at least a first retransmission of the attempts is selected to be r slot times longer than the prescribed backoff time;

determining if the second node is waiting a first backoff time for a first retransmission attempt;

in response to a determination that the second node is waiting the first backoff time, monitoring the channel for activity from the first node on the network, operating a backoff timer when the channel is idle, and halting the backoff timer during any period in which the channel is not idle;

in response to a determination that the second node is not waiting the first backoff time, operating the backoff timer; and attempting retransmission of the second packet when the backoff timer expires.

3. The method in as in claim 1 or 2 wherein the step of monitoring the channel for activity from the second node further comprises recognizing when the second node is transmitting on the channel.

4. The method in as in claim 1 or 2 wherein the step of monitoring the channel for activity from the second node further comprises recognizing when a collision is occurring on the channel.

5. The method in as in claim 1 or 2 wherein the step of monitoring the channel for activity from the second node further comprises recognizing when the first node is transmitting or a collision is occurring on the channel.

6. For use in a first node in a network having a plurality of nodes employing Carrier Sense Multiple Access with Collision Detection (CSMA/CD) protocol for channel access, an apparatus for improving the fairness of access to a channel, comprising:

means for sensing whether or not the first node has captured a channel;

means for sensing a collision between a first packet transmission by the first node and a second packet transmission by a second node on the network;

means, in response to sensing the collision, for selecting a backoff time to wait before making each of a number of retransmission attempts of the second packet, the selected backoff time between each said attempt and the immediately preceding attempt conforming to a selected integral multiple r of a slot time, where r is a positive integer, and corresponding to the number of the retransmission attempts made previously, whereby, if the first node has captured the channel, the backoff time is a prescribed backoff time;

if the first node has not captured the channel, the backoff time before making at least a first of the retransmission attempts is selected to be r slot times longer than the prescribed backoff time;

means for monitoring the channel for activity from the first node of the network;

a backoff timer to provide a backoff time for retransmission of the second packet;

means for operating the backoff timer when the channel is idle;

means for halting the backoff timer during any period in which the channel is not idle; and means for attempting retransmission of the second packet when the backoff timer expires.

7. For use in a first node in a network having a plurality of nodes employing Carrier Sense Multiple Access with Collision Detection (CSMA/CD) protocol for channel access, an apparatus for improving the fairness of access to a channel, comprising:

means for sensing whether or not the first node has captured a channel;

means for sensing a collision between a first packet transmission by the first node and a second packet transmission by a second node on the network;

means, in response to sensing the collision, for selecting a backoff time to wait before making each of a number of retransmission attempts of the second packet, the selected backoff time between each said attempt and the immediately preceding attempt conforming to a selected integral multiple r of a slot time, where r is a positive integer, and corresponding to the number of the retransmission attempts made previously, whereby, if the first node has captured the channel, the backoff time is a prescribed backoff time;

if the first node has not captured the channel, the backoff time before making at least a first of the retransmission attempts is selected to be r slot times longer than the prescribed backoff time;

a backoff timer to provide a backoff time for retransmission of the second packet;

means for determining if the second node is waiting a first backoff time for a first retransmission attempt of the second packet;

means, in response to a determination that the second node is waiting the first backoff time, for monitoring the channel for activity from the first node on the network, operating a backoff timer when the channel is idle, and halting the backoff timer during any period in which the channel is not idle;

means, in response to a determination that the second node is not waiting the first backoff time, for operating a backoff timer; and means for attempting retransmission of the second packet when the backoff timer expires.

8. The apparatus as in claim 6 or 7 wherein the means for monitoring the channel for activity from second node further comprises means for recognizing when second node is transmitting on the channel.

9. The apparatus as in claim 6 or 7 wherein the means for monitoring the channel for activity from second node further comprises means for recognizing when a collision is occurring on the channel.

10. The apparatus as in claim 6 or 7 wherein the means for monitoring the channel for activity from the second node further comprises means for recognizing when second node is transmitting or a collision is occurring on the channel.

11. For use in a first node in a network having a plurality of nodes employing Carrier Sense Multiple Access with Collision Detection (CSMA/CD) protocol for channel access, a method for improving the fairness of access to a channel, comprising the steps of:

sensing whether or not the first node has captured a channel;

sensing a collision between a first packet transmission by the first node and a second packet transmission by a second node on the network;

after sensing the collision, examining the contents of a data field in second packet requiring retransmission to determine whether a special backoff algorithm should be used for the second packet;

in response to a determination that the special backoff algorithm should be used, selecting a backoff time to wait before making each of a number of retransmission attempts of the second packet, the selected backoff time between each said attempt and the immediately preceding attempt conforming to a selected integral multiple r of a slot time, where r is a positive integer, and corresponding to the number of the retransmission attempts made previously, whereby, if the first node has captured the channel, the backoff time is a prescribed backoff time;

if the first node has not captured the channel, the backoff time before at least a first of the retransmission attempts is selected to be r slot times longer than the prescribed backoff time, and wherein the backoff time before a second retransmission of the second packet attempt is selected to be r slot times shorter than the prescribed backoff time, monitoring the channel for activity from the second node on the network, operating a backoff timer when the channel is idle, and halting the backoff timer during any period in which the channel is not idle;

in response to a determination that the special backoff algorithm should not be used, operating a backoff timer; and attempting retransmission of the second packet when the backoff timer expires.

* * * * *